July 1, 1930.  C. E. HENRY  1,768,762
ADJUSTABLE TOOL HOLDER FOR LATHES, ETC
Filed Dec. 12, 1927
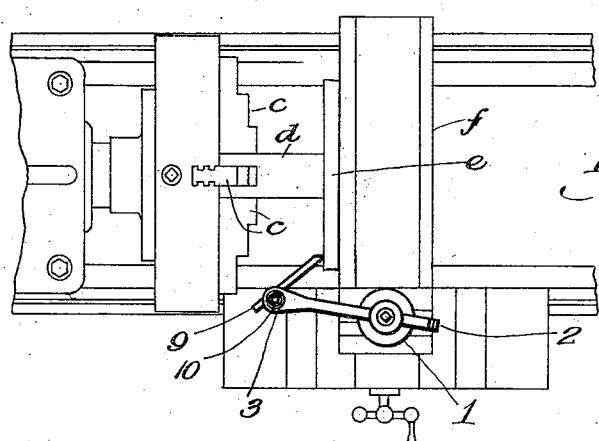
Fig. 1.
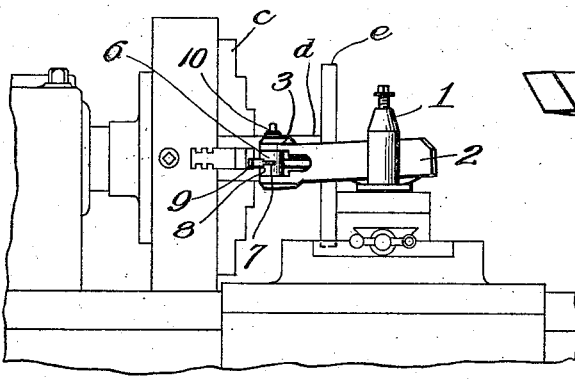
Fig. 2.
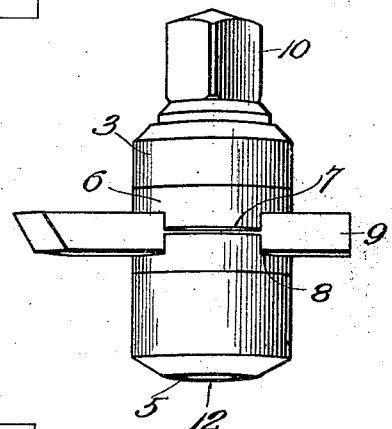
Fig. 3.
Fig. 5.
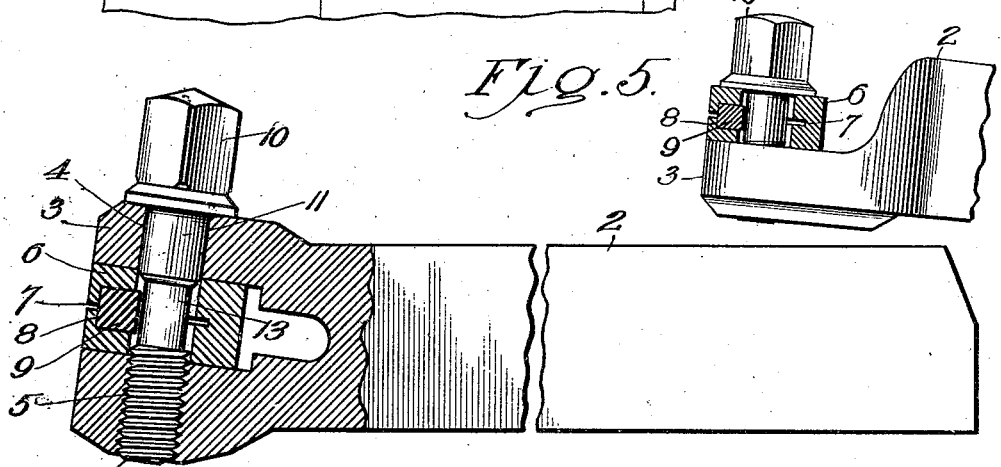
Fig. 4.
INVENTOR
C. E. Henry
BY Thorpe & Thorpe
ATTORNEYS Patented July 1, 1930

1,768,762

UNITED STATES PATENT OFFICE

CLAYTON E. HENRY, OF KANSAS CITY, KANSAS, ASSIGNOR OF ONE-HALF TO H. J. BRILL, OF KANSAS CITY, MISSOURI

ADJUSTABLE TOOL HOLDER FOR LATHES, ETC.

Application filed December 12, 1927. Serial No. 239,441.

This invention relates to tool holders for lathes, shapers and the like. Conventional practice provides for a number of different holders to meet most requirements, but occasionally a piece of work confronts an operator which cannot be done through the use of any of the conventional holders unless the stock or article is first re-chucked in reversed position, and the re-chucking operation is always avoided if possible because it takes up about thirty minutes of a skilled operator's time and hence may make the cost of the work prohibitive.

It is my object, therefore, to produce a tool holder of such character that it will not only accommodate most of the tools for lathe and shaper work on the front or sides of the stock or article, but also provides for efficient operation by the tool on the back of the stock or article, regardless of the size thereof, and without necessitating the re-chucking of the latter.

Accordingly I have provided a holder having a head containing a horizontally-split collar of spring steel or the like, for holding the tool, and a clamping means whereby the collar may be caused to so grip the tool that the latter shall be incapable of movement in any direction, the collar being adapted for rotative adjustment when unclamped to provide for the proper or desired setting or direction of the tool. In the preferred construction, the head of the holder is forked, and of spring metal and the clamping means clamps the fork ends or jaws upon the collar to cause the latter to perform its clamping function on the tool.

With the object named in view the invention consists in certain novel and useful features of construction and combinations of parts as hereinafter described and claimed; and in order that it may be fully understood, reference is to be had to the accompanying drawing, in which:

Figure 1 represents diagrammatically a top view of a portion of a lathe and a piece of work thereon, and also discloses a tool holder embodying the invention, in operative position.

Figure 2 is a side view of the same.

Figure 3 is an end view of the tool holder.

Figure 4 is a side view of the tool holder with the operative end in central vertical longitudinal section, and also shows a tool clamped in operative position in the holder.

Figure 5 is a sectional view of a slightly modified construction of the holder.

Referring now to the drawing in detail, 1 indicates the conventional tool post of a lathe, and 2 the shank of a tool holder to be clamped rigidly in the post in the customary manner.

The operative end of the holder terminates in an enlargement or head 3 horizontally bifurcated in Figures 1 to 4 inclusive, to provide upper and lower arms which are of spring metal and serve as clamping jaws, the upper arm or jaw having a cylindrical passage 4 and the lower arm or jaw a threaded passage 5 in alinement with passage 4.

Fitting in the bifurcation is a collar 6, the bore of the same being alined with the passage 4, and said collar is provided horizontally with a slit 7 so that the parts overlying and underlying the slit shall constitute upper and lower jaws, the collar being of spring metal and the said jaws of the collar tending to separate. The collar is provided at one side of its axis with an angular passage 8 conjointly formed in the said jaws and adapted for the reception of an angular tool 9.

A bolt extending through the passages of the shank head and the said collar, is composed of a head 10 and a stem consisting of a smooth cylindrical upper portion 11 and a threaded portion 12, portion 11 being adapted to engage the passage 4 and portion 12, the threaded passage 5, and to prevent the removal of the bolt from the head without first removing the tool and to avoid making the collar of greater diameter than necessary, the stem where it extends through the collar is of reduced diameter as at 13, the tool extending through said recess and into the path of withdrawal movement of the threaded portion 12, it being noted of course that sufficient withdrawing movement of the bolt may occur to unclamp the tool before the upper end of the threaded portion can come into contact with the tool, which therefore can be withdrawn when the bolt is turned backward to a sufficient extent to effect the unclamping operation. It will further be noted by reference to Figure 4, that the screwing home of the bolt will clamp the jaws of the head upon opposite sides of the split collar and hence cause the latter to clamp on opposite sides of the tool. By referring to Figure 5, it will be noted the head of the holder is not forked and hence be apparent that the screwing home of the bolt will cause the head thereof to clamp down upon the upper side of the collar directly instead of through the upper jaw of the head. This represents a modification which is the same in principle but not as desirable, as by the preferred construction a wider clamping area on the collar, is provided.

Referring now to Figure 1, c represents chuck jaws of the lathe and d, a piece of work mounted therein and provided with a relatively large head e. With the ordinary tool holder, the tool can be brought to bear for operative purposes on the face or edges of the head 3, but cannot be brought to bear efficiently, if at all, on the back of the work, because with the ordinary tool holder the tool projects generally in approximately longitudinal alinement with the shank of the holder. With a small head c which will permit the carrier f of the lathe to pass below it, it is possible to use the ordinary tool holder for use of the tool on the back of the head, but with a piece of work with a head e, of such size as to limit the movement of the tool post 1 toward the head stock, it is impossible with the ordinary tool holder to apply the tool to the back of the head e. Figures 1 and 2 indicate a head e, of such size that the carrier cannot pass below it, but by arranging the holder to project toward the head stock, the sleeve can be adjusted rotatably to dispose the tool against the back of said head e, as shown. The bolt 10 is then turned to clamp the tool in the desired position and then the manipulation of the lathe occurs in the conventional manner. With this arrangement it is possible therefore to face off, groove or finish the back of a head such as e, without re-chucking the piece of work, and the avoidance of the re-chucking operation results in a substantial saving.

It will be noted that the bifurcation of the tool holder is horizontal transversely but extends at an angle when disposed longitudinally of the shank, and that the clamping bolt extends perpendicularly to such angle. This angular disposition is for conventional purposes, that is, for permitting the tool normally to incline slightly upward and thus facilitate the separation of shavings from the part shaved. Of course when the tool is adjusted to extend at right angles to the shank this slight angular arrangement advantage is not present, but it is only occasionally that the tool will be set in the position last named.

From the above description it will be apparent that I have produced a tool holder embodying the feature of advantage set forth as desirable in the statement of the object of the invention, and which is susceptible of modification in minor particulars without departing from the principle of construction involved or from the spirit and scope of the appended claim.

I claim:

A tool holder having a horizontally forked spring-metal head providing a pair of spaced jaws, said jaws having alined passages, the passage in one being smooth and the passage in the other threaded, a headed bolt extending through said jaw passages and having a smooth portion in the smooth passage and a threaded portion in the threaded passage, and a horizontally slit spring-metal collar fitting between the jaws of the head and revoluble therein, the bore of the collar being in alinement with the passages of the jaws and of larger diameter than the threaded portion of the bolt; said collar being also provided at one side of the bolt with a tool-receiving cross passage formed conjointly by the jaws formed by the slit.

In testimony whereof I affix my signature.

CLAYTON E. HENRY.